United States Patent [19]
Whittaker et al.

[11] Patent Number: 5,919,982
[45] Date of Patent: Jul. 6, 1999

[54] PROCESS AND APPARATUS FOR THE REMOVAL OF AROMATIC AMINES FROM SOIL AND WATER

[75] Inventors: Harry Whittaker, Manotick; Valdis Kokars; Janis Avotins, both of Riga Latvia; Laura Ouellette, Ottawa, all of Canada

[73] Assignee: Her Majesty the Queen in right of Canada, as represented by Environment, Ottawa, Canada

[21] Appl. No.: 08/870,357

[22] Filed: Jun. 6, 1997

[30] Foreign Application Priority Data

Jun. 6, 1996 [CA] Canada ................... 2178377

[51] Int. Cl.$^6$ ...................... B09B 3/00
[52] U.S. Cl. ............. 564/437; 405/128; 405/264
[58] Field of Search ............. 564/437; 71/903; 405/258, 263, 300, 264, 128

[56] References Cited

U.S. PATENT DOCUMENTS

| | | |
|---|---|---|
| 4,715,965 | 12/1987 | Sigerson et al. |
| 4,985,083 | 1/1991 | Sogaard ................... 134/26 |
| 5,518,621 | 5/1996 | Holcombe et al. ............ 210/634 |
| 5,562,834 | 10/1996 | Bremer et al. ............ 210/750 |
| 5,651,833 | 7/1997 | Bremer et al. ............ 134/22.15 |
| 5,660,500 | 8/1997 | Marsden, Jr. et al. ......... 405/128 |
| 5,664,911 | 9/1997 | Bridges et al. ............ 405/128 |

FOREIGN PATENT DOCUMENTS

| | | |
|---|---|---|
| 0 540 342 | 5/1993 | European Pat. Off. |
| 37 06 684 A 1 | 10/1987 | Germany. |
| 41 31 216 | 4/1993 | Germany. |
| WO 90/06820 | 6/1990 | WIPO. |

OTHER PUBLICATIONS

Brouwers, "Tweetrapsstoomstrippen succesvol toegepast", Land–Water Jul./1994, XP 000589036.

*Primary Examiner*—Brian M. Burn
*Attorney, Agent, or Firm*—Andrew Hicks

[57] ABSTRACT

A process and apparatus for the removal of aromatic amines from soil and water is described. In particular, treatment trains are described in which soil washing or low temperature desorption process effect removal of contaminant, such as xylidines from soil and steam stripping is utilized to remove contaminant from water. Further treatment through organic acid precipitation and advanced oxidation produce clean water and precipitated salts which may be recovered.

16 Claims, 4 Drawing Sheets

CONCENTRATION OF XYLIDINE FROM CONTAMINATED WATER EXPERIMENTS (INITIAL CONCENTRATION- 245 ppm) IN THE STEAM STRIPPER COLUMN TOPS REMOVAL EFFICIENCY OF XYLIDINE FROM CONTAMINATED WATER EXPERIMENTS (INITIAL CONCENTRATION-245 ppm)

PROCESS AND APPARATUS FOR THE REMOVAL OF AROMATIC AMINES FROM SOIL AND WATER

FIELD OF THE INVENTION

A process and apparatus for the removal of aromatic amines from soil and water is described. In particular, treatment trains are described in which soil washing or low temperature desorption process effect removal of contaminant, such as xylidines from soil and steam stripping is utilized to remove contaminant from water. Further treatment through organic acid precipitation and advanced oxidation produce clean water and precipitated salts which may be recovered.

BACKGROUND OF THE INVENTION

The contamination of soil and ground water with toxic substances poses health problems to both animals and humans. A particular example of such contamination is the presence of aromatic amines in soil and groundwater above acceptable toxicity levels. Accordingly, in areas where such contamination has occurred, remediation and recovery of such compounds is necessary in order for land to be suitable for agriculture, forestry or recreation.

In particular, activities carried out at former Soviet military bases in Latvia have resulted in the discharge of various toxic substances into the environment. Since the abandonment of these bases, local residents have been able to access these lands thereby exposing them to the risk of exposure to the toxic substances. Large scale clean-up operations are required in order to return these lands to safe use.

Soil and water samples taken from these lands revealed high levels of xylidine-based missile fuel SAMIN and various oil products. Oil contamination is certain areas reached 6,000–7,000 ppm while the xylidine contamination reached several thousand ppm and as high as 20,000 ppm in particular locations. Xylidines have been found to be toxic at levels as low 2 ppm upon inhalation or skin contact. Accordingly, a high degree of remediation is required in order to return contaminated land to a safe level.

Furthermore, as xylidine compounds are valuable compounds in a variety of industrial processes, there has been a need for non-destructive remediation technologies in which the xylidine compounds may be recovered for re-use.

A variety of soil treatment technologies exist for the remediation of contaminated soil such as soil washing, solvent extraction and low temperature thermal desorption.

Soil washing is a physical treatment method in which contaminants are removed from the soil by solubilizing them, or suspending them in a fluid such as water with or without surfactants or detergents. The soil is separated from the washing fluid with the contaminants, fine soil particles and soluble components of the soil staying in the washing fluid. Ultimately the contaminants are concentrated in the washing fluid and the "cleaned" soil is tested to ensure the contaminants have reached target levels and then returned to its original site. In some cases, soil washing alone can reduce the contaminant concentrations to acceptable levels and therefore serve as a stand-alone technology. In other cases, it can be a cost-effective pre-processing step in reducing the quantity of material to be processed. It is important to note that this process does not destroy but rather concentrates the contaminants for further processing. Although this treatment method is suitable for a wide range of contaminant problems, generally it is most effective on coarse material.

Solvent extraction is differentiated from soil washing because it utilizes organic solvents or critical fluids to remove hydrophobic contaminants from the soil. The extracting fluid is then separated from the soil by a physical method such as filtration. The soil may require additional treatment to remove any residual extracting fluid. The extracting fluid may then be treated and recycled back into the process. The effectiveness of this process is dependent upon the nature of the contaminant, soil type and extracting agent used. Several methods of enhancing solvent extraction have been developed.

Low temperature desorption is a process by which either direct or indirect heating is used to raise the temperature of a contaminated soil to volatilize the organic contaminants and water into an exhaust gas. The contaminants in the exhaust gas are either destroyed in an afterburner or recovered by condensation into a liquid form. The condensate may then be separated into organic and water fractions. Thermal desorbers generally operate at relatively low soil discharge temperatures, typically in the range of 150° C. to 500° C. This process can be used for the remediation of a wide range of contaminants such as petroleum products and pesticides.

Steam stripping allows steam to come into contact with the contaminated water causing the contaminants to volatilize and transfer from the water to the steam. Although the contact between the two phases may be achieved by a variety of methods, most traditional units are counter-current packed columns. The driving force for the contaminant transfer is the concentration differential between the liquid and vapour phase. The vapour outlet stream is condensed and the contaminant is recovered in a concentrated water stream. The stripping temperature is important since Henry's law constant (ratio of the contaminant concentration in the water and vapour phase) is temperature dependent. Other important system operating parameters are the steam to feed ratio, and the pH of the feed stream.

Advanced oxidation is a technique that may be used to degrade organic contaminants in ground water and in some cases mineralize them to undetectable levels. Advanced oxidation processes are applicable for treatment of low concentration contaminated ground waters and as a post-treatment step. Ultra-violet light in conjunction with powerful oxidants such as hydrogen peroxide and Fenton's reagent treatment generate powerful hydroxyl radicals. The hydroxyl radicals oxidize the organic contaminants which are kept in an excited state and vulnerable to attack by the UV/oxidant system. In the absence of ultra-violet light, Fenton reagent (dark Fenton's reaction) produces hydroxyl radicals by the interaction of hydrogen peroxide with ferrous salts. The reaction is retarded after complete conversion of the ferrous ions ($Fe^{2+}$) to ferric ions ($Fe^{3+}$). The irradiation of this solution (photo-Fenton's reaction) includes the photoreduction of $Fe^{3+}$ to $Fe^{2+}$ ions allowing the generation of hydroxyl radicals to continue. The irradiation of hydrogen peroxide solution involves a single step dissociation of the hydrogen peroxide to form two hydroxyl radicals.

SUMMARY OF THE INVENTION

In accordance with the invention, a process for the removal of aromatic amines from contaminated soil and water is provided, comprising the steps of:

a. subjecting the soil to a low temperature desorption process to effect desorption of the aromatic amines;
b. subjecting the water to a steam stripping process to effect transfer of aromatic amines to a vapour phase;
c. condensing aromatic amines from the desorption and steam stripping processes to form condensed aromatic amines;
d. subjecting the condensed aromatic amines to a precipitation process to form aromatic amine salts.

In another embodiment, step (a) comprises subjecting the soil to a soil washing process to form washed soil water, step (b) comprises subjecting the water and washed soil water to a steam stripping process to effect transfer of aromatic amines to a vapour phase and step (c) comprises condensing aromatic amines from step (b) to form condensed aromatic amines.

In various embodiments of the invention, the aromatic amines are xylidines, the contaminated groundwater is subjected to filtration prior to the steam stripping process, the pH of the contaminated groundwater is adjusted prior to the steam stripping process and the precipitation process is an organic acid precipitation process.

In one embodiment, the organic acid is phthalic acid.

In alternative embodiments, the bottoms water from the steam stripping process is subjected to an advanced oxidation process and the supernatant from the precipitation process is subjected to an advanced oxidation process.

In another embodiment, soil from the low temperature desorption process is optionally subjected to bioremediation.

In a still further embodiment, soil fines from the filtration process are subjected to low temperature desorption.

Preferably, the operating temperature of the low temperature desorption process is in the range of 140–240° C. and the process is conducted under vacuum. Still further, it is preferred that the contaminated water is pre-heated prior to entry into the counter current column to 25–90° C. and that the feed/steam ratio in the counter current column is 1.9–8.5 L/kg.

Still further, it is preferred that the advanced oxidation process is a combination of photolysis and hydrogen peroxide oxidation or a combination of photolysis, hydrogen peroxide oxidation and Fenton's reagent oxidation. It is also preferred that the pH of the contaminated groundwater is adjusted to greater than 6.0.

In a specific embodiment, the invention provides a process for the removal of aromatic amines from contaminated soil comprising the steps of:

a. subjecting the soil to a low temperature desorption process to effect desorption of the aromatic amines;
b. condensing aromatic amines from the low temperature desorption process to form condensed aromatic amines;
c. subjecting the condensed aromatic amines to a precipitation process to form aromatic amine salts.

In another specific embodiment, a process for the removal of aromatic amines from contaminated water is provided, comprising the steps of:

a. subjecting the water to a steam stripping process to effect transfer of aromatic amines to a vapour phase;
b. condensing aromatic amines from the steam stripping process to form condensed aromatic amines;
c. subjecting the condensed aromatic amines to a precipitation process to form aromatic amine salts.

In accordance with an alternate embodiment of the invention, an apparatus for removing aromatic amines from contaminated soil and water is provided, comprising:

low temperature desorption means to effect desorption of the aromatic amines;
steam stripping means to effect transfer of aromatic amines to a vapour phase;
condensing means for condensing aromatic amines from the desorption and steam stripping means;
precipitation means for forming aromatic amine salts.

Preferably, the low temperature desorption means is a rotary kiln.

BRIEF DESCRIPTION OF THE DRAWINGS

These and other features of the invention will be more apparent from the following description in which reference is made to the appended drawings wherein.

DETAILED DESCRIPTION OF THE INVENTION

In accordance with the invention, an apparatus and process is herein described for the remediation and recovery of aromatic amines from contaminated soil and water.

Figure 1:
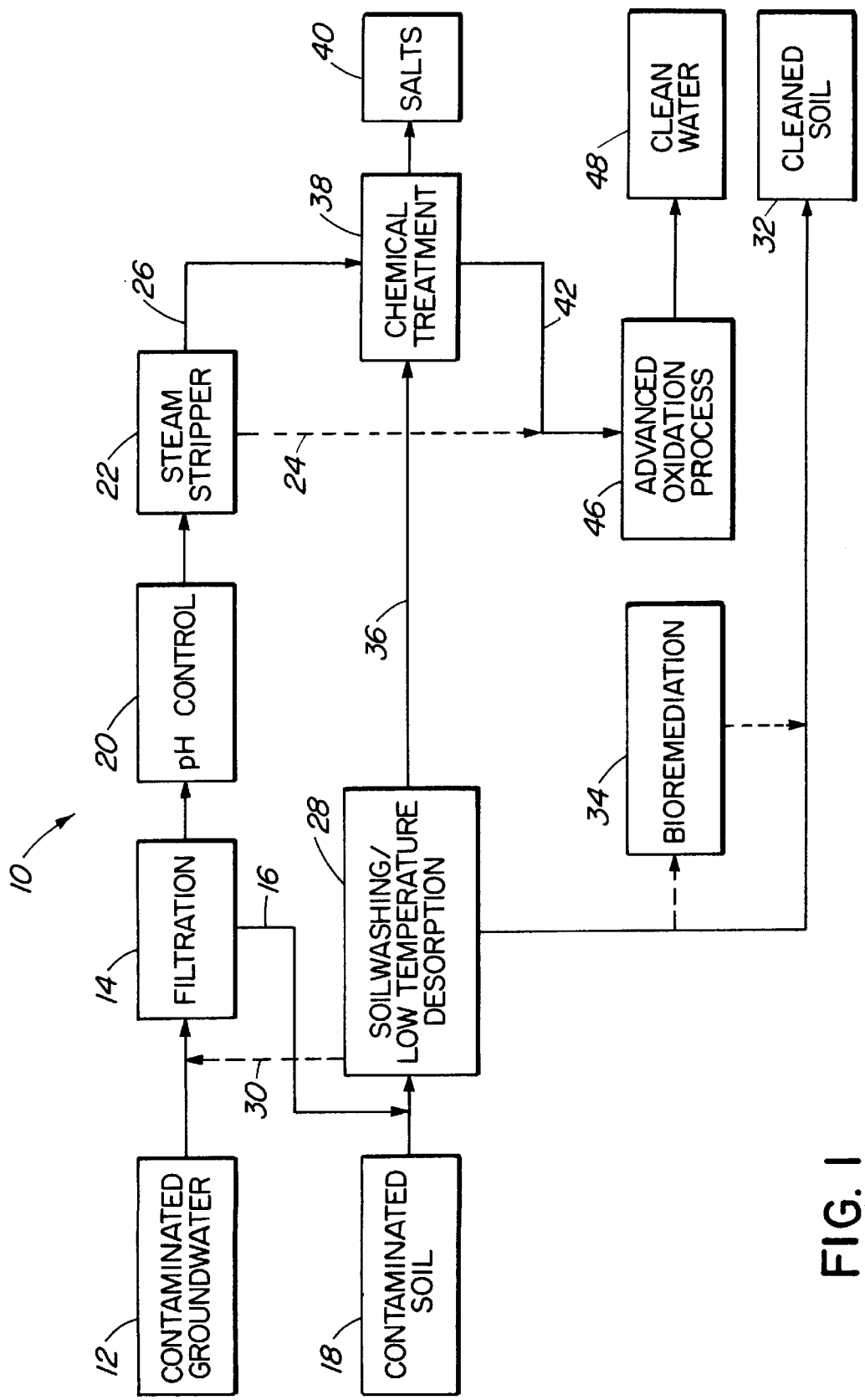
FIG. 1 is a schematic flow diagram in accordance with the invention wherein a combined remediation process for cleaning both contaminated soil and water is described.

With reference to FIG. 1, a combined treatment train 10 is provided for the removal of aromatic amine contaminant from soil and water. Contaminated groundwater 12 is filtered in filtration unit 14 to remove any suspended soil fines. The soil fines 16 may be removed for processing with contaminated soil 18. After filtration, the groundwater 12 is optionally subjected to pH control 20 to adjust the pH of the water for improving the efficiency of downstream processes. After pH control, the water is subjected to steam stripping to effect mass transfer of the contaminant from the liquid phase to the gaseous phase through counter-current flow with steam. Steam stripping of the contaminant is preferably conducted in a steam stripping unit 22 where contaminated groundwater 12 flows downwardly within a stripping column against an upwardly flowing countercurrent flow of steam. At the bottom of the column, water 24 with a reduced contaminant concentration is removed from the column for further processing. At the top of the column, steam 26 containing an increased contaminant concentration is removed and condensed.

In a parallel treatment train, contaminated soil 18 is subjected to a soil washing or low temperature desorption process 28 to effect mass transfer of contaminant from the soil. The selection of a soil washing or low temperature desorption process is subject to the specific characteristics of the soil wherein a coarser soil sample is more likely to be subjected to a soil washing process rather than a low temperature desorption process in consideration of the cost effectiveness.

In a situation utilizing soil washing, the contaminant is transferred to the liquid phase forming a contaminated water phase 30 and may thereafter be introduced to the water treatment train prior to the filtration step as described above.

In a situation utilizing low temperature desorption, the soil sample is heated to a temperature around the contaminant's boiling point to effect transfer of the contaminant to the vapour phase. Preferably, low temperature desorption is conducted in a rotary kiln wherein the soil sample is passed through a heated jacket by a screw auger. Vapours released from the soil are trapped and condensed thereby forming a concentrated mixture containing contaminant and water, the water being simultaneously vaporized from the soil during heating within the kiln. Treated soil passing through the rotary kiln is removed from the system as cleaned soil which may be subjected to a further bioremediation stage 34 if required.

The condensate 36 from the low temperature desorption stage 28 and the condensate 26 from the steam stripping stage 22 are subjected to a chemical treatment step 38 to effect precipitation of salts 40 from the condensate.

During chemical treatment, the condensates 26 and 36 are treated with organic acid such as phthalic-acid to effect precipitation of phthalic acid salts from solution. Filtering enables removal of the precipitate from solution, thereby producing supernatant having a reduced contaminant concentration 42. This solution 42 and solution 24 may then be subjected to further treatment step at 44 to effect further contaminant removal such as an advanced oxidation process thereby producing clean water 48.

Figure 2:
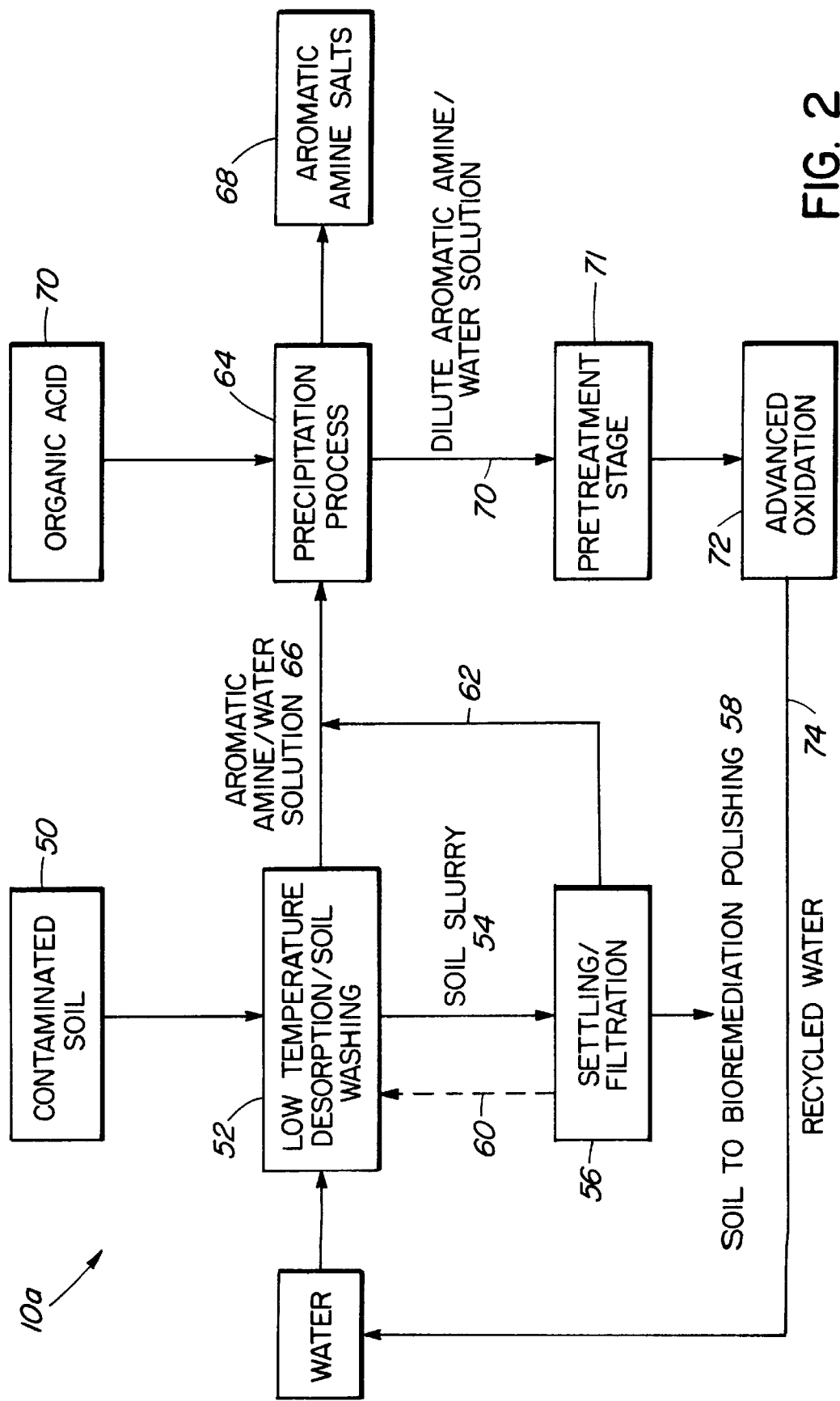
FIG. 2 is a schematic flow diagram in accordance with the invention wherein a remediation process for cleaning contaminated soil is described.
Figure 3:
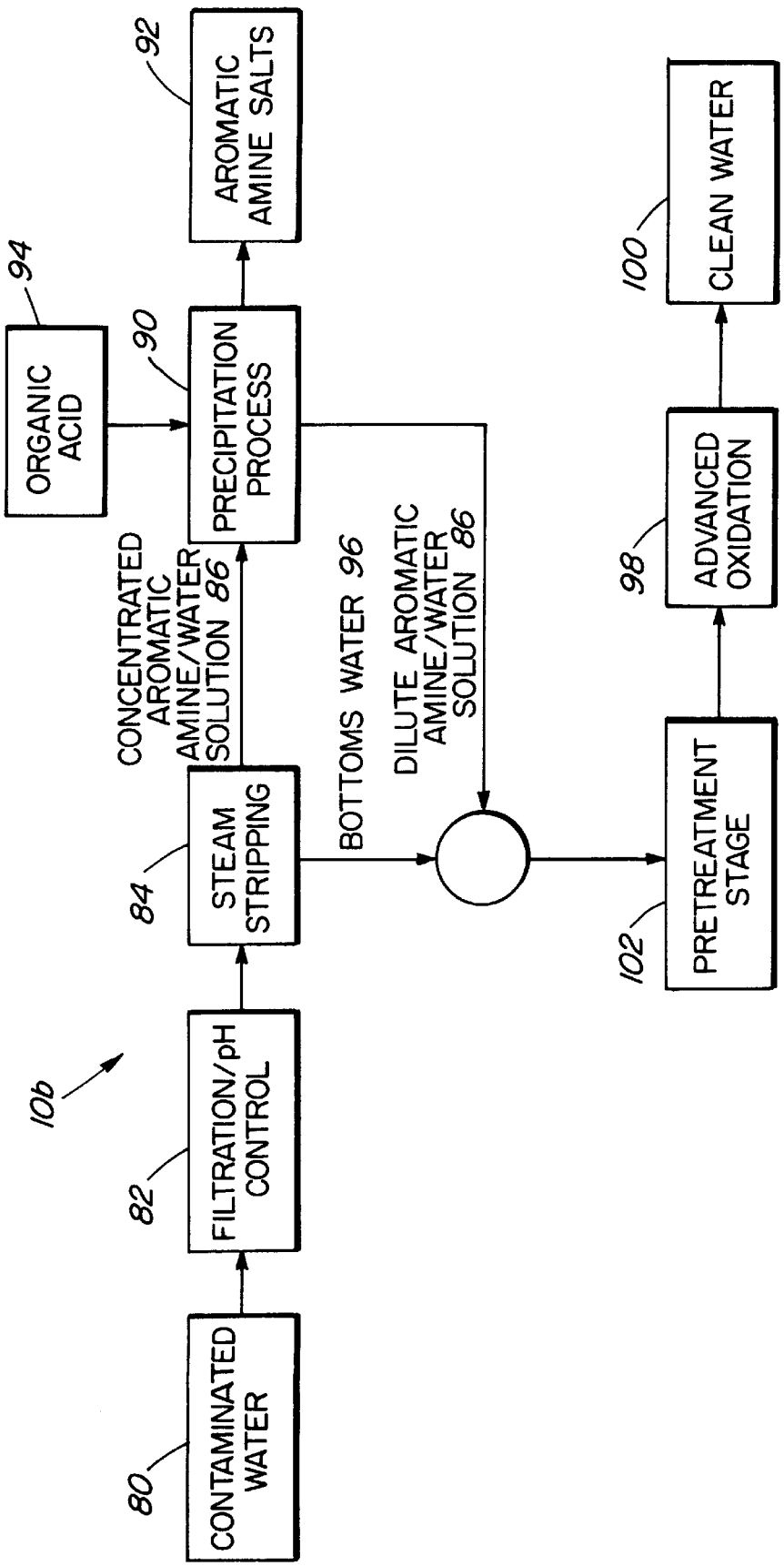
FIG. 3 is a schematic flow diagram in accordance with the invention wherein a remediation process for cleaning contaminated water is described.

As shown in FIGS. 2 and 3, separate soil and water treatment trains 10a and 10b may be provided for the treatment of contaminated soil and water respectively.

With reference to FIG. 2, a distinct treatment train 10a is provided for removal of contaminant from soil. In this treatment train, contaminated soil 50 is subjected to a soil washing or low temperature desorption process as described above. In the case of soil washing a soil slurry is produced for settling/filtration 56. Soil removed from settling/filtration 56 may be removed as cleaned soil 58 where, if needed, it is subjected to bioremediation. Alternatively, the soil 60 may be returned for further washing 52. Water 62, containing contaminant may then be subjected to a precipitation process 64 as described above.

Alternatively, in the case of low temperature desorption a solution containing increased contaminant concentration 66 is produced for precipitation process 64.

As described above, the precipitation process 64 may form salts by reaction with an organic acid 70. A dilute solution 70 containing contaminant maybe removed from the precipitate and subjected to an advanced oxidation treatment 72 for further contaminant removal. An optional pretreatment stage 71 may also be conducted. Water 74 may be recycled for re-use at 52.

FIG. 3 shows a treatment train 10b to effect removal of contaminant from water. As described above, water 80 is subjected to filtration and pH control 82 whereby steam stripping 84 produces a concentrated contaminant/water solution 86. Precipitation process 90 is provided for producing salts 92 through treatment with organic acid 94. Dilute contaminant/water solution 92 along with dilute bottoms water 96 from steam stripping 84 may be subjected to advanced oxidation 98 to produce clean water 100. Pre-treatment 102 of the dilute contaminant/water solution may precede advanced oxidation 98.

In accordance with the above, soil and water samples contaminated with 2,4 xylidine and 2,5 xylidine were cleaned. Spiked water samples were produced by adding specific amounts of 2,4 xylidine and 2,5 xylidine to deionized water. A soil containing 70 wt % sand, 10 wt % black earth, 10 wt % peat and 10 wt % water was produce and spiked with a xylidine/methanol solution. The methanol was thereafter evaporated by air drying at room temperature.

Table 1 shows the effect of soil washing experiments on the removal of xylidine from soil. While the efficiency of removal of xylidines is high, the solubility of the xylidines in the soil results in a slow dissolution rate. As a result, it is necessary to use large volumes of water to reach acceptable target levels of xylidines in the soil. Furthermore, soil washing may provide further problems with respect to the filtration of fines from the slurry and, accordingly, should be used only when the relative amount of fines is minimized.

TABLE 1

Final Concentrations and Efficiency of Removal of Xylidines from Soil

| Water/soil ratio | Concentration of xylidines in the soil (ppm) at the washing time | | | Efficiency of removal of xylidines, % | | |
|---|---|---|---|---|---|---|
| L/kg | 30 min | 120 min | 24 h | 30 min | 120 min | 24 h |
| 3 | 5512 | 3624 | 1958 | 11.5 | 41.8 | 68.6 |
| 4 | 4354 | 2832 | 1710 | 30.1 | 54.5 | 72.6 |
| 5 | 3870 | 2544 | 1295 | 37.9 | 59.2 | 79.2 |
| 6 | 3642 | 2068 | 866 | 41.5 | 66.8 | 86.1 |
| 7 | 2768 | 1831 | 847 | 55.6 | 70.6 | 86.4 |
| 8 | 2685 | 1565 | 710 | 56.9 | 74.9 | 88.6 |

Table 2 shows the results of low temperature desorption on the removal of xyldines from soil. For xylidine recovery optimization with low temperature desorption, the soil should contain water in order that steam may be produced and utilized as a carrier gas. The presence of water/steam also lessens the destruction/oxidation of the xylidines by reducing the oxygen concentration in the desorption unit. As indicated above, the gaseous emissions from the low temperature desorption process can be condensed to obtain a relatively concentrated xylidine/water solution/emulsion without the carryover of fines from the soil. By applying a partial vacuum, the temperature for desorption may be reduced. In selecting an optimal desorption temperature, consideration is given to desired target levels of contaminant in the soil for a given heating level and exposure time.

TABLE 2

Removal of xylidine from soil using LTD

| Time of exposure, min. | Concentration of xylidines (ppm) in the soil at different temperatures | | | | | |
|---|---|---|---|---|---|---|
| | 140° C. | 160° C. | 180° C. | 200° C. | 220° C. | 240° C. |
| 0 | 4806 | 4806 | 4806 | 4806 | 4806 | 4806 |
| 5 | 3456 | 2503 | 2147 | 1018 | 479 | 87 |
| 10 | 1531 | 717 | 428 | 222 | 63 | 7 |
| 15 | 834 | 441 | 93 | 20 | 13 | 2 |
| 30 | 332 | 103 | 22 | 6 | 2 | 0 |

Table 3 shows the effect of steam stripping with respect to feed/steam ratios and initial feed concentrations of xylidine contaminated water. The results show an increasing feed/steam ratio for a given feed concentration increases the final condensate concentration from the top of the column.

TABLE 3

Concentration of Xylidine Using Steam-Stripping

| Feed/steam ratio, L/kg | Final xylidine concentrations at the top of column at different initial concentrations | | | |
|---|---|---|---|---|
| | 1098 ppm | 692 ppm | 239 ppm | 133 ppm |
| 1.9 | 2434 | 1252 | 599 | 305 |
| 3.6 | 4200 | 1916 | 1062 | 507 |
| 5.3 | 5158 | 2341 | 1285 | 617 |
| 8.5 | 6044 | 3611 | 1537 | 1055 |

Table 3a shows further results for the removal efficiency and final concentrations of xylidine at different initial concentrations and feed/steam ratios.

TABLE 3a

Removal Efficiency and Final Concentration of Xylidine at the Different Initial Concentrations and Feed/Steam Ratio Final Concentration at the column tops (ppm) and removal efficiency (%)

| Feed/steam ratio, L/kg | initial concentration - 25 ppm | | initial concentration - 112 ppm | | initial concentration - 508 ppm | |
|---|---|---|---|---|---|---|
| | ppm | removal, % | ppm | removal, % | ppm | removal, % |
| 1.4 | 16 | 93.4 | 67 | 90.9 | 237 | 70.3 |
| 1.9 | 21 | 89.1 | 90 | 85.9 | 333 | 69.7 |
| 2.4 | 43 | 83.6 | 174 | 78.1 | 683 | 67.2 |
| 3.6 | 63 | 77.2 | 263 | 73.1 | 1035 | 63.2 |
| 4.5 | 96 | 67.6 | 392 | 63.0 | 1602 | 56.5 |
| 5.6 | 143 | 58.1 | 565 | 52.4 | 2242 | 45.7 |
| 7.2 | 199 | 40.8 | 799 | 37.3 | 2506 | 31.2 |

Table 4 shows the effect of advanced oxidation experiments on the destruction of residual xylidines from dilute solutions of contaminated water. These experiments utilized UV photolysis, UV hydrogen peroxide, photo Fenton's reaction and Fenton's reaction to effect destruction of residual xylidines. The results show that the photolysis oxidation of 2,4 and 2,5 xylidines requires a prohibitively long residence time to obtain non-detect levels. The results of the hydrogen peroxide/UV experiments indicate a trend of decreasing exposure time required to achieve non-detect levels of xylidine with increasing hydrogen peroxide concentrations. The Fenton's reagent experiments shows that the presence of Fenton's reagent enhances oxidation particularly in the presence of UV light.

TABLE 4

Advanced Oxidation of 2,5 xylidine Water Solutions

| Time of exposure, min | UV* | UV HP**-100 | UV HP-200 | UV HP-500 | UV HP-1000 | HP-1000 FR***-50 | UV HP-1000 FR-50 |
|---|---|---|---|---|---|---|---|
| 0 | 94 | 123 | 123 | 131 | 156 | 90 | 90 |
| 2 | 88 | 84 | 103 | 85 | 81 | 77 | 58 |
| 4 | 80 | 55 | 62 | 45 | 46 | 76 | 48 |
| 6 | 74 | 42 | 44 | 0 | 0 | 70 | 0 |
| 8 | 71 | 36 | 36 | 0 | 0 | 67 | 0 |
| 10 | 67 | 30 | 29 | 0 | 0 | 63 | 0 |
| 15 | 58 | 24 | 0 | 0 | 0 | 0 | 0 |

*UV — ultraviolet light
**HP — hydrogen peroxide, ppm
***FR — Fenton reagent, ppm Table 5 shows the effect of steam stripping with respect to the removal efficiency of xylidines from contaminated water with an initial concentration of 300 ppm with respect to feed/steam ratios. The results show that the removal efficiency drops as the feed/steam ratio increases. At a lower feed/steam ratio, the removal efficiency is high whereas at a higher feed/steam ratio, the removal efficiency drops. Accordingly, in the operation of the system, a balance between feed/steam ratio and removal efficiency must be realized in order to maximize system efficiency for given operating cost considerations. Additional parameters including the concentration of the contaminant entering the process (Table 3), feed pH and temperature are also important as discussed below. The results, as shown in Table 5, also indicate that there is very little difference with respect to the removal efficiency for different xylidine isomers.

TABLE 5

Final Concentrations and Removal Efficiency of Xylidines from Contaminated Water with Initial Concentration of 300 ppm

| Feed/steam ratio, L/kg | Concentrations of xylidine, ppm | | | | |
|---|---|---|---|---|---|
| | 2,4 xylidine | | | 2,5 xylidine | mixture* |
| | tops | bottom | removal, % | tops | tops |
| 1.9 | 199 | 60 | 74.2 | 191 | 197 |
| 2.5 | 526 | 79 | 66.1 | 518 | 515 |
| 4.1 | 836 | 97 | 60.3 | 851 | 843 |
| 5.1 | 1108 | 131 | 48.4 | 1149 | 1121 |

*mixture of 2,4 and 2,5 in a ratio 3:1

Table 6 shows the effect of pH and feed/steam ratio on xylidine concentration in the steam stripper. As xylidine solubility is dependent on the pH of the solution, increasing the solution acidity causes the xylidines to protonate thereby increasing their solubility in water. Accordingly, maintaining a higher pH in the feed stream is desirable.

TABLE 6

Effect of pH on Xylidine Concentration in Steam Stripper Column Tops with Initial Feed Concentration of 774 ppm

| Feed/steam ratio, L/kg | Final xylidine concentrations (ppm) at the top of column at different pH | | | |
|---|---|---|---|---|
| | pH 2.7 | pH 5.3 | pH 6.1 | pH 8.2 |
| 1.9 | 734 | 1165 | 1752 | 1768 |
| 3.8 | 834 | 2438 | 3288 | 3294 |
| 5.3 | 962 | 3172 | 4061 | 4058 |
| 8.5 | 1053 | 3551 | 4661 | 4682 |

Figure 4:
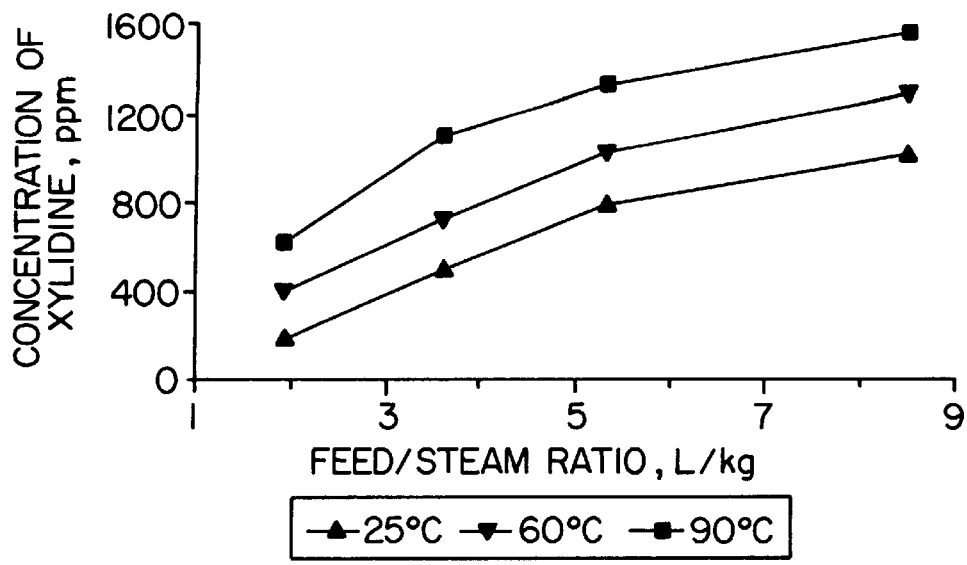
FIG. 4 is a plot of the concentration of condensate concentration from a steam stripper vs. feed/steam ratio for different feed stream temperatures.
Figure 5:
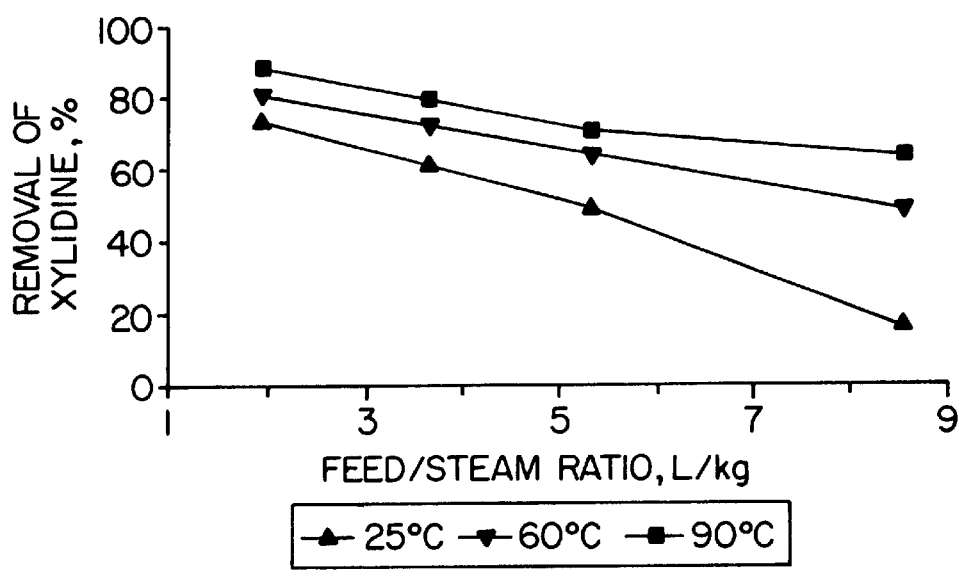
FIG. 5 is a plot of the concentration of the removal efficiency of xylidine from contaminated water in a steam stripper vs. feed/steam ratio for different feed stream temperatures.

FIGS. 4 and 5 show the effect of feed stream temperature on condensate xylidine concentration and removal efficiency. FIG. 4 shows that for a given feed/steam ratio, increasing feed stream temperature improves the concentration of contaminant in the condensate. FIG. 5 shows that for a given feed/steam ratio, increasing feed stream temperature improves the removal efficiency. Still further, FIG. 5 shows that the loss in removal efficiency for increasing feed/steam ratio is less dramatic than for a lower temperature feed stream.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A process for the removal of aromatic amines from contaminated soil and water comprising the steps of:
   a. subjecting the soil to a low temperature desorption process to effect desorption of the aromatic amines and/or subjecting the water to a steam stripping process to effect transfer of aromatic amines to a vapour phase;
   b. condensing aromatic amines from the desorption and/or steam stripping processes to form condensed aromatic amines;
   c. subjecting the condensed aromatic amines to an organic acid treatment to effect precipitation of acid salts;
   d. subjecting the acid salts to filtration for removal of acid salts; and
   e. subjecting a resulting filtrate to an advanced oxidation process to form aromatic amine salts.

2. A process as in claim 1, wherein the contaminated groundwater is subjected to pre-filtration prior to the steam stripping process.

3. A process as in claim 2, wherein soil fines from the pre-filtration process are subjected to low temperature desorption.

4. A process as in claim 1, wherein the soil from the low temperature desorption process is further subjected to bioremediation.

5. A process as in claim 1, wherein the pH of the contaminated groundwater is adjusted prior to the steam stripping process.

6. A process as in claim 5, wherein the pH of the contaminated groundwater is adjusted to greater than 6.0.

7. A process as in claim 1, wherein the low temperature desorption process is conducted under vacuum.

8. A process as in claim 1, wherein the steam stripping process is conducted in a counter current column and the contaminated water is pre-heated prior to entry into the counter current column.

9. A process as in claim 8, wherein the steam stripping process has an operating temperature in the range of 140–240° C.

10. A process as in claim 8, wherein the feed/steam ratio in the counter current column is 1.9–8.5 L/kg.

11. A process as in claim 10, wherein the contaminated water is pre-heated to 25–90° C.

12. A process as in claim 1, wherein the advanced oxidation process is selected from a combination of photolysis and hydrogen peroxide oxidation or photolysis, hydrogen peroxide and Fenton's reagent oxidation.

13. A process as in claim 1, wherein the aromatic amines are xylidines.

14. A process as in claim 1, wherein the organic acid is phthalic acid.

15. An apparatus for removing aromatic amines from contaminated soil and water comprising:

low temperature desorption means to effect desorption of the aromatic amines;

steam stripping means to effect transfer of aromatic amines to a vapour phase;

condensing means for condensing aromatic amines from the desorption and steam stripping means;

precipitation means for forming aromatic amine salts;

filtration means for removal of aromatic amine salts; and advanced oxidation process means for forming aromatic amine salts.

16. An apparatus as in claim 15, wherein the low temperature desorption means is a rotary kiln.

* * * * *